(12) United States Patent
 Chandraker

(10) Patent No.: US 9,336,600 B2
(45) Date of Patent: May 10, 2016

(54) SHAPE FROM MOTION FOR UNKNOWN, ARBITRARY LIGHTING AND REFLECTANCE

(71) Applicant: NEC Laboratories America, Inc., Princeton, NJ (US)

(72) Inventor: Manmohan Chandraker, Santa Clara, CA (US)

(73) Assignee: NEC Corporation (JP)

(*) Notice: Subject to any disclaimer, the term of this patent is extended or adjusted under 35 U.S.C. 154(b) by 282 days.

(21) Appl. No.: 14/073,794

(22) Filed: Nov. 6, 2013

(65) Prior Publication Data

US 2014/0132727 A1 May 15, 2014

Related U.S. Application Data

(60) Provisional application No. 61/725,728, filed on Nov. 13, 2012.

(51) Int. Cl.
*H04N 13/02* (2006.01)
*G06T 7/00* (2006.01)

(52) U.S. Cl.
CPC ............ *G06T 7/0055* (2013.01); *G06T 7/0065* (2013.01)

(58) Field of Classification Search
USPC .......................................................... 348/46
See application file for complete search history.

(56) References Cited

U.S. PATENT DOCUMENTS

| 5,500,904 A | * | 3/1996 | Markandey | ........... G06T 7/2066 382/103 |
| 2007/0206008 A1 | * | 9/2007 | Kaufman | .............. G06T 15/005 345/424 |
| 2007/0211069 A1 | * | 9/2007 | Baker | ..................... G06T 15/80 345/587 |

* cited by examiner

*Primary Examiner* — Tracy Li
(74) *Attorney, Agent, or Firm* — Joseph Kolodka

(57) ABSTRACT

Systems and methods are disclosed for determining three dimensional (3D) shape by capturing with a camera a plurality of images of an object in differential motion; derive a general relation that relates spatial and temporal image derivatives to BRDF derivatives; exploiting rank deficiency to eliminate BRDF terms and recover depth or normal for directional lighting; and using depth-normal-BRDF relation to recover depth or normal for unknown arbitrary lightings.

20 Claims, 11 Drawing Sheets

Rank-deficient relations across image sequence

Motion field:

Orthographic camera $$\mu = \begin{bmatrix} -v\omega_3 + \tau_1 + \omega_2 z \\ u\omega_3 + \tau_2 - \omega_1 z \end{bmatrix}$$

Perspective camera $$\mu = \begin{bmatrix} \omega_2\beta u^2 - \omega_1\beta uv - \omega_3 v + \dfrac{1}{1+\beta z}(\tau_1 - \beta u\tau_3 + \omega_2 z) \\ -\omega_1\beta v^2 - \omega_2\beta uv + \omega_3 u + \dfrac{1}{1+\beta z}(\tau_2 - \beta v\tau_3 - \omega_1 z) \end{bmatrix}$$

Form of differential stereo relation:

$$p z + q = \omega^T \pi$$

$$p'\left(\dfrac{z}{1+\beta z}\right) + r'\left(\dfrac{1}{1+\beta z}\right) + q' = \omega^T \pi$$

In either case, form of $p$ is $p = E_u \omega_2 - E_v \omega_1$.
Matrix with rows $[p, q, w]$ from different images is rank deficient.
This rank deficiency can be used to eliminate BRDF (and lighting).

FIG. 3

Using the form of depth-normal-BRDF relation

Orthographic camera       Perspective camera

Motion field:

$$\mu = \begin{bmatrix} -v\omega_3 + \tau_1 + \omega_2 z \\ u\omega_3 + \tau_2 - \omega_1 z \end{bmatrix} \quad \mu = \begin{bmatrix} \omega_2\beta u^2 - \omega_1\beta uv - \omega_3 v + \frac{1}{1+\beta z}(\tau_1 - \beta u\tau_3 + \omega_2 z) \\ -\omega_1\beta v^2 - \omega_2\beta uv + \omega_3 u + \frac{1}{1+\beta z}(\tau_2 - \beta v\tau_3 - \omega_1 z) \end{bmatrix}$$

Form of differential
stereo relation: $\quad p^i z + q^i = \pi^T \omega^i, \quad i = 1, \ldots, m \quad (p^A + \beta q^A)z - ((1+\beta z)\pi)^T \omega^A + (q^A + r^A) = 0.$ In either case, $n^T \pi = 0$.
This constraint can be used to eliminate BRDF and arbitrary unknown lighting).

Depth From Colocated Lighting + Perspective Camera 202

Modeling
Isotropic BRDF, colocated lighting $\rho(n \cdot s)$
Differential stereo relation (one per image):
$$\nabla_u E^\top \mu + E_t = (n \times \nabla_n \log\rho)^\top \omega = \alpha(\omega_2 n_1 - \omega_1 n_2)$$
$$\alpha = (\log\rho)'(n^\top s)$$
$$p\left(\frac{z}{1+\beta z}\right) + r\left(\frac{1}{1+\beta z}\right) + q$$

Key Steps
Eliminate BRDF using rank deficiency across 3 or more images:
$$z = \lambda_0(1+\beta z) \quad (1)$$
$$\boxed{\frac{z_x}{z_y} = \frac{\lambda_1 + \lambda_2 z}{\lambda_3 + \lambda_4 z}} \quad (2)$$
Homogeneous Quasilinear PDE

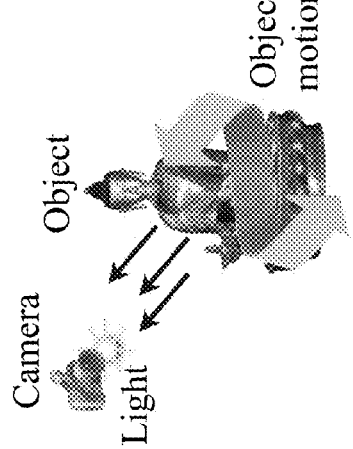

Camera
Light
Object
Object motion

Reconstruction Methods

Method 1:
(i) Recover depth from eqn (1)
(ii) Constrain normals using eqn (2)
(iii) Refine depth by comparing normals to depth derivatives.

Method 2:
(i) Discretize the quasilinear PDE (2)
(ii) Solve for depth as a nonlinear optimization problem using (1) and (2).

FIG. 6

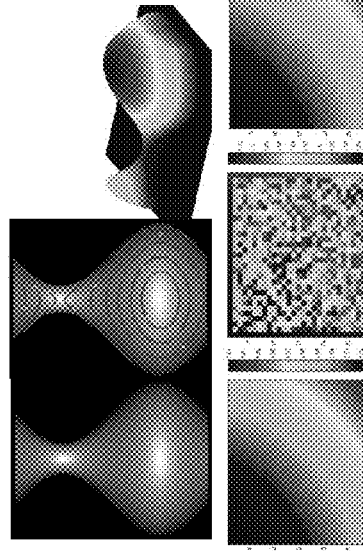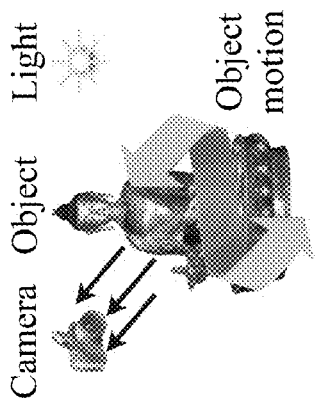
FIG. 7

Depth From Unknown Directional Lighting + Perspective Camera 302

Modeling

Isotropic BRDF, fixed camera + lighting $\rho(n) = f(n^\top s, n^\top v)$

Differential stereo relation (one per image):

$$\rho\left(\frac{z}{1+\beta z}\right) + r\left(\frac{1}{1+\beta z}\right) + q \quad \boxed{\nabla_u E^\top \mu + E_t} = (n \times \nabla_n \log\rho)^\top \omega$$

$$= [n \times (\alpha\hat{s} + \beta v)]^\top \omega$$

$$\alpha = \frac{1}{\|\hat{s}\|} \frac{\partial(\log f)}{\partial(n^\top s)} \text{ and } \beta = \frac{\partial(\log f)}{\partial(n^\top v)}$$

Key Steps

Eliminate BRDF and lighting using rank deficiency across >4 images:

$$z = \lambda_0(1 + \beta z) \quad (1)$$

Inhomogeneous Quasilinear PDE $$(\lambda_1 + \lambda_2 z)z_x + (\lambda_3 + \lambda_4 z)z_y + \gamma_4 = 0. \quad (2)$$

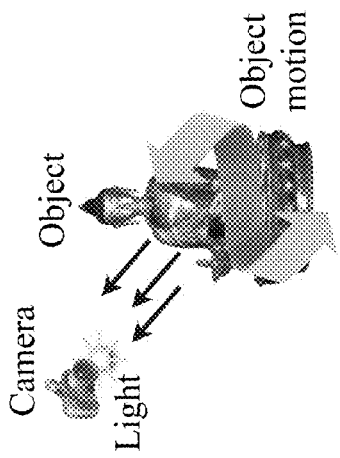

Camera / Object / Light / Object motion

Reconstruction Methods

Method 1:
(i) Recover depth from eqn (1)
(ii) Constrain normals using eqn (2)
(iii) Refine depth by comparing normals to depth derivatives.

Method 2:
(i) Discretize the quasilinear PDE (2)
(ii) Solve for depth as a nonlinear optimization problem using (1) and (2).

FIG. 8

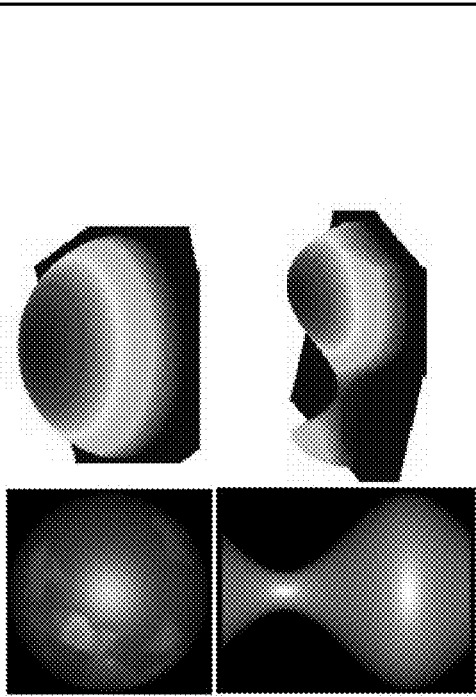
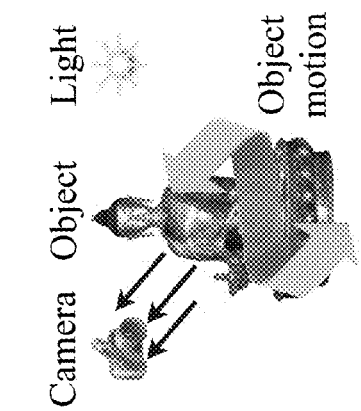
FIG. 10

SHAPE FROM MOTION FOR UNKNOWN, ARBITRARY LIGHTING AND REFLECTANCE

This application is a utility conversion and claims priority to Provisional Application Ser. 61/725,728 filed Nov. 13, 2012, the content of which is incorporated by reference.

BACKGROUND

The present invention relates to 3D shape modeling.

An open problem in computer vision since early works on optical flow has been to determine the shape of an object with unknown reflectance undergoing differential motion, when observed by a static camera under unknown illumination.

Shape from differential motion is solved under the umbrella of optical flow methods. They rely on brightness constancy assumptions, such as assuming that the local brightness of an image point does not change with variation in lighting and viewing configuration (which is obviously incorrect from a physical point of view). Shape reconstruction methods that account for this variation in brightness attempt to model the image formation as a diffuse reflection, which is inaccurate for most real-world objects.

SUMMARY

Systems and methods are disclosed for determining three dimensional (3D) shape by capturing with a camera a plurality of images of an object in differential motion; derive a general relation that relates spatial and temporal image derivatives to BRDF derivatives; exploiting rank deficiency to eliminate BRDF terms and recover depth or normal for directional lighting; and using depth-normal-BRDF relation to recover depth or normal for unknown arbitrary lightings.

The above system solves the fundamental computer vision problem of determining shape from small (differential) motion of an object with an unknown surface reflectance. In the general case, reflectance is an arbitrary function of surface orientation, camera and lighting (henceforth called the bidirectional reflectance distribution function, or the BRDF). The system can handle several camera and illumination conditions:

(a) Unknown arbitrary lighting, unknown general reflectance
  (i) Orthographic projection
  (ii) Perspective projection
(b) Unknown directional lighting, unknown general reflectance
  (i) Orthographic projection
  (ii) Perspective projection
(c) Colocated lighting
  (i) Orthographic projection
  (ii) Perspective projection
(d) Area lighting
(e) RGB+Depth sensor The system can model the dependence of image formation on the bidirectional reflectance distribution function (BRDF) and illumination, to derive a physically valid differential flow relation. Even when the BRDF and illumination are unknown, the differential flow constrains the shape of an object through an invariant relating surface depth to image derivatives. The form of the invariant depends on the camera projection and the complexity of the illumination. For orthographic projections, three differential motions suffice and the invariant is a quasilinear partial differential equation (PDE). For perspective projections, surface depth may be directly recovered from four differential motions, with an additional linear PDE constraining the surface normal. The involved PDEs are homogeneous for simple illuminations, but inhomogeneous for complex lighting. Besides characterizing the invariants, in each case, surface reconstruction may be performed.

Advantages of the preferred embodiment may include one or more of the following. The system can recover shape from motion under conditions of general, unknown BRDF and illumination. So, the methods are the first of their kind that can handle shape reconstruction under challenging imaging conditions. Further, prior methods simplify the problem with physically incorrect assumptions like brightness constancy or diffuse reflectance. In contrast to conventional method, we correctly account for reflectance behavior as an unknown BRDF, relate it to image intensities and demonstrate that it is still possible to recover the shape. By correctly accounting for the BRDF, we improve the accuracy of shape reconstruction. The system can handle both orthographic and perspective camera projections, with arbitrary unknown distant lighting (directional or area).

BRIEF DESCRIPTION OF THE FIGURES

FIG. 3 shows an exemplary process for determining rank-deficient relations across image sequences.

FIG. 4 shows an exemplary process with depth-normal BRDF relation.

FIG. 6 shows more details from FIG. 1 of a process to handle depth from collocated lighting and a perspective camera.

FIG. 7 shows more details from FIG. 1 of a process to handle depth from unknown but directional lighting and an orthographic camera.

FIG. 8 shows more details from FIG. 1 of a process to handle depth from unknown directional lighting and a perspective camera.

FIG. 10 shows more details from FIG. 1 of a process to handle depth from unknown arbitrary lighting and a perspective camera.

DESCRIPTION

The present system solves the fundamental computer vision problem of determining shape from the (small or differential) motion of an object with unknown isotropic reflectance, under unknown distant illumination. The system works with a fixed camera, without restrictive assumptions like brightness constancy, Lambertian BRDF or a known directional light source. Under orthographic projection, three differential motions suffice to yield an invariant that relates shape to image derivatives, regardless of BRDF and illumination. Further, we delineate the topological classes up to which reconstruction may be achieved using the invariant.

Under perspective projection, four differential motions suffice to yield depth and a linear constraint on the surface gradient, with unknown BRDF and lighting. The invariants are homogeneous partial differential equations for simple lighting, and inhomogeneous for more complex lighting. The system uses a stratification of shape recovery, related to the number of differential motions required, generalizing earlier work with Lambertian BRDFs. The reconstruction methods are validated on synthetic and real data.

Figure 1:
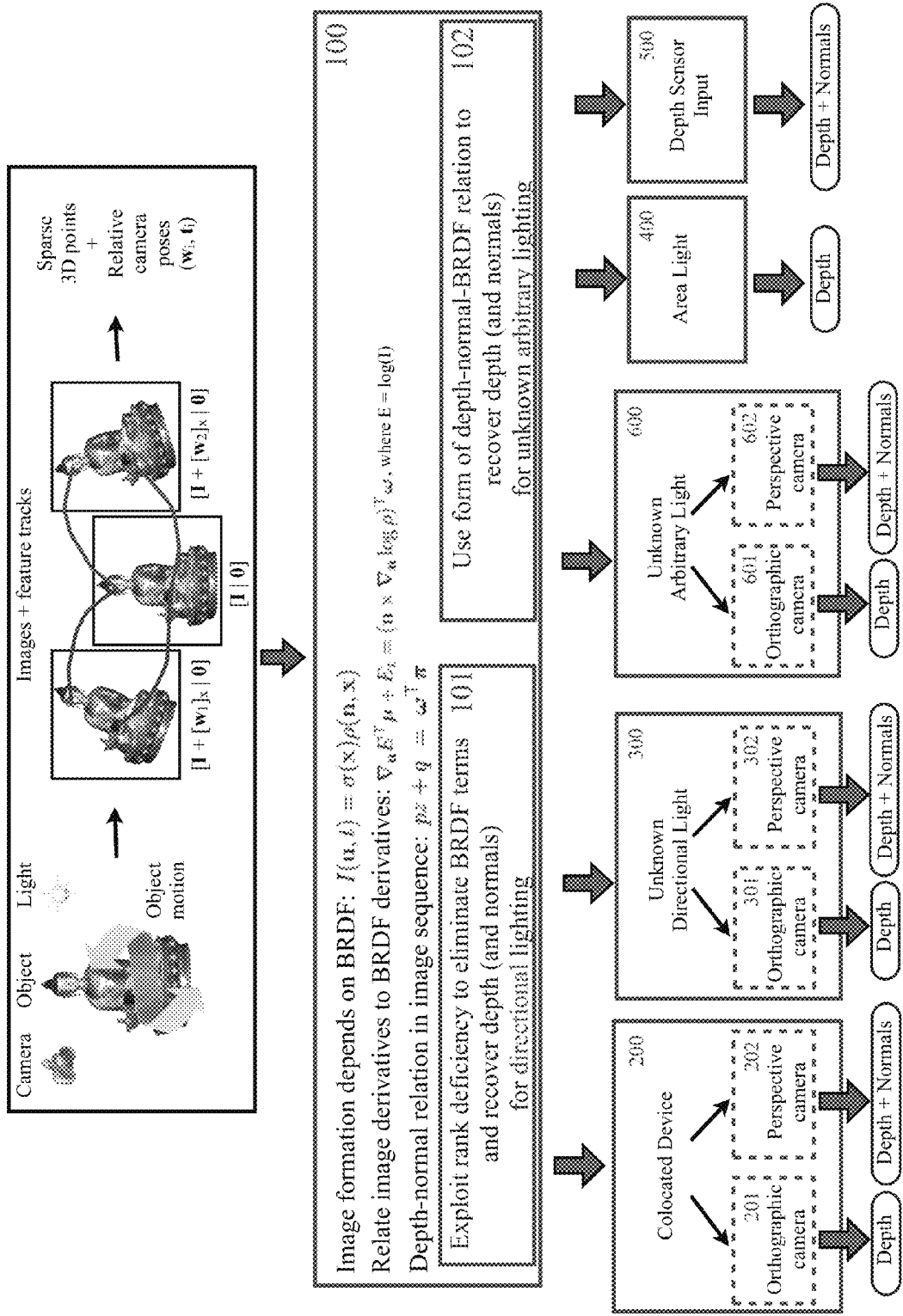
FIG. 1 shows an exemplary process on a generalized version of an optical flow relation that flexibly handles a number of parametric bidirectional reflectance distribution function (BRDF) and solutions to recover surface depth.
Figure 2:
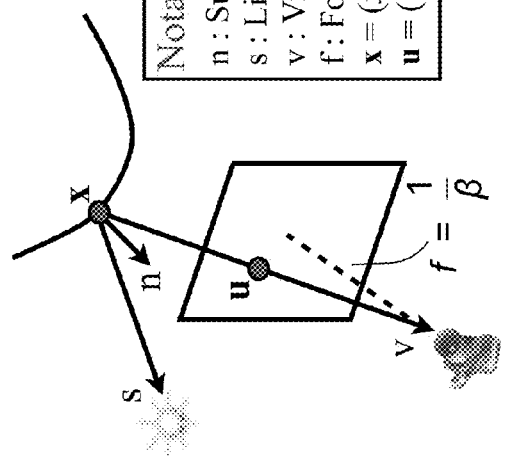
FIG. 2 shows more details from FIG. 1 of a process to handle differential stereo relations.
Figure 5:
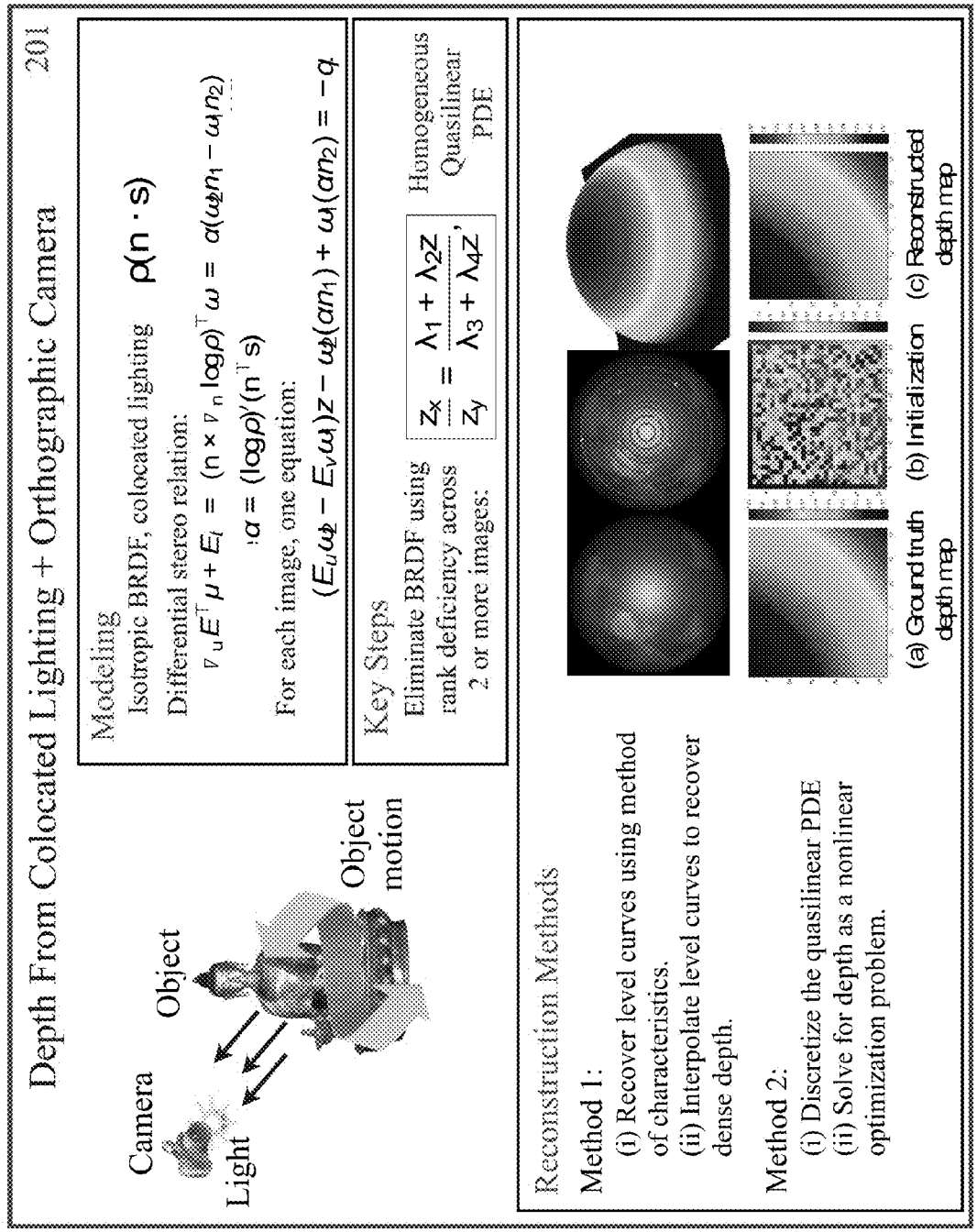
FIG. 5 shows more details from FIG. 1 of a process to handle depth from collocated lighting and an orthographic camera.
Figure 9:
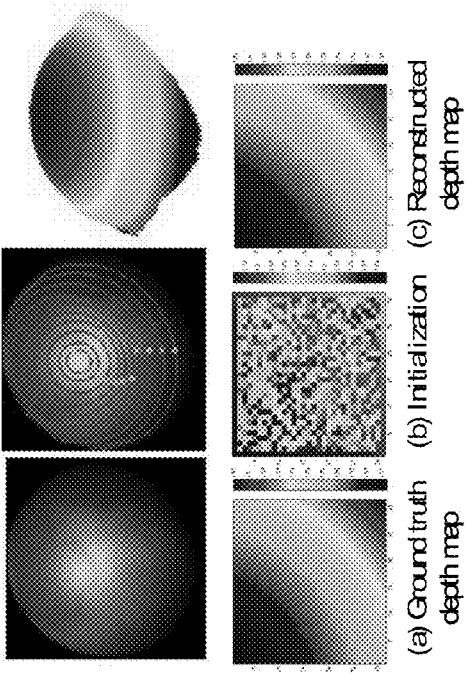
FIG. 9 shows more details from FIG. 1 of a process to handle depth from unknown arbitrary lighting and an orthographic camera.
Figure 11:
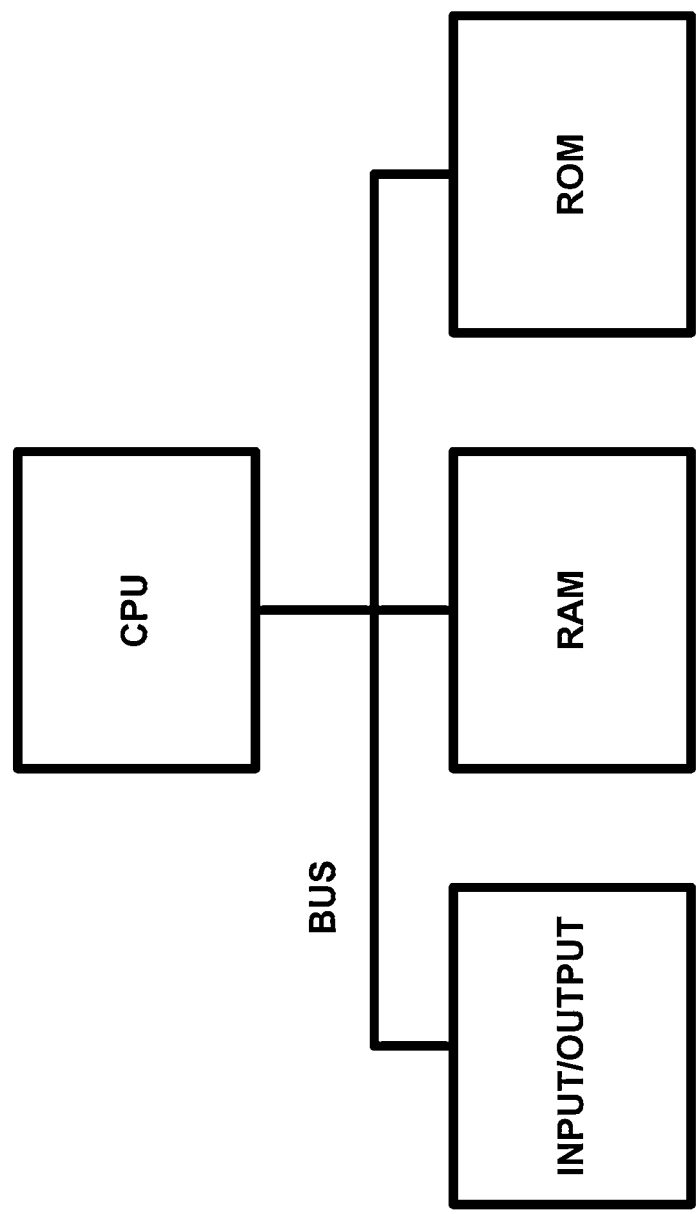
FIG. 11 shows an exemplary computer to run processes of FIGS. 1-10.

FIGS. 1-10 show an exemplary process (100) providing for a generalized version of an optical flow relation that flexibly handles a number of parametric BRDFs and solutions to recover surface depth. In contrast, the system of FIG. 1 derives the relation for general BRDFs and relates it to the surface depth. FIG. 1 shows a top level view of major modules 101-602, while FIGS. 2-10 provide more details on each module.

Turning now to FIG. 1, the method includes a module (101) to observe a rank deficiency in relation across different images. This rank deficiency can be exploited to recover depth, as explained in following sections. The method also includes a module (102) that directly uses a relationship between the depths, normal and BRDF to derive constraints on surface depth. This is valid for arbitrary, unknown lighting.

FIG. 1 also includes module (200) where the rank deficiency in module (101) can be used to estimate depth for lighting colocated with the camera. An isotropic BRDF in this case depends only on the magnitude of the gradient. Module (201) handles the case where the camera model is orthographic. Then, using 2 or more differential pairs of images, the system may eliminate BRDF terms to derive a homogeneous quasilinear PDE in surface depth. This PDE can be solved to recover level curves of the surface using a method of characteristics. The level curves are interpolated to recover dense depth. Module (202) handles the case where the camera model is perspective. Then, using 3 or more differential pairs of images, we may eliminate BRDF terms to extract two equations. The first directly yields the surface depth, while the second is a homogeneous quasilinear PDE in surface depth. Since depth is known from the first equation, the second equation may now be treated as a constraint on the surface normal.

Module (300) applies the rank deficiency in module (101) to estimate depth for an unknown directional point light source. It is assumed that the object is moving under a fixed camera and light source. An isotropic BRDF in this case depends on the two angles between the (surface normal, light) and (surface normal, camera). Module (301) handles the case where the camera model is orthographic. Then, we show that using 3 or more differential pairs of images, we may eliminate BRDF terms to derive an inhomogeneous quasilinear PDE in surface depth. This PDE can be solved to recover level curves of the surface using a method of characteristics. The level curves are interpolated to recover dense depth. In module (302), the camera model is perspective. Then, using 4 or more differential pairs of images, we may eliminate BRDF terms to extract two equations. The first directly yields the surface depth, while the second is an inhomogeneous quasilinear PDE in surface depth. Since depth is known from the first equation, the second equation may now be treated as a constraint on the surface normal.

Module (400) handles an area light source, where a diffuse BRDF is a quadratic function of the surface normal. The differential stereo relation now becomes a nonlinear PDE in surface depth, which may be solved using nonlinear optimization methods.

In module (500), with a depth sensor and RGB camera input, the differential stereo relation is a decoupled expression in the depth and surface normal. This decoupling can be exploited to design more efficient optimization algorithms (such as alternating minimization).

In module (601), the camera model is orthographic. Then, using 3 or more differential pairs of images, we may use module (102) to eliminate BRDF terms to derive an inhomogeneous quasilinear PDE in surface depth. This PDE can be solved to recover level curves of the surface using a method of characteristics. The level curves are interpolated to recover dense depth. Module (602) handles the situation where the camera model is perspective. Then, using 4 or more differential pairs of images, we may use module (102) to eliminate BRDF terms to extract two equations. The first directly yields the surface depth, while the second is a linear constraint on the surface gradient. The two constraints may be combined to yield a highly sparse linear system, which can be solved efficiently to recover the surface depth.

The system of FIG. 1 achieves high performance by:
(a) instead of assuming brightness constancy or Lambertian reflectance, we model the correct dependence of surface reflectance on surface normal, lighting and viewing directions
(b) we recognize a rank deficiency in the differential stereo relations and recognize that it can be used to eliminate BRDF and lighting dependence
(c) we recognize a relationship in the depth-normal-BRDF relationship, which can be used to eliminate BRDF and dependence on arbitrary unknown lighting
(d) we manage to eliminate the BRDF and lighting, so we can handle objects that reflect light in complex ways, without need to calibrate the lighting
(e) we derive our BRDF-invariant expressions in the form of quasilinear PDEs, which can be conveniently solved with predictable solution properties (initial conditions, accuracy and convergence behavior)
(f) we derive linear constraints on depth and gradient, which can be solved efficiently as a sparse linear system to yield surface depth with unknown BRDSF and arbitrary unknown illumination.

In one implementation, we first derive a general relation that relates spatial and temporal image derivatives to BRDF derivatives. Directly using the relation for shape recovery is not possible due to a rank deficiency.

We exploit the form of the relationship to derive the following for arbitrary unknown lighting:
(i) For orthographic projections, we derive a first-order quasilinear partial differential equation (PDE) which can be solved for surface depth using a method of characteristics.
(ii) For perspective projections, we show that it is possible to directly estimate depth from image derivatives in four or more images.
(iii) For perspective images, we derive an additional constraint on the surface gradient.
(iv) We demonstrate that the depth and gradient constraints may be combined to yield an efficient solution for surface depth as a sparse linear system.

We exploit the rank deficiency in (a) to derive solutions for several camera and lighting conditions:
(i) For orthographic projections, we derive a first-order quasilinear partial differential equation (PDE) which can be solved for surface depth using a method of characteristics.
(ii) For perspective projections, we show that depth may be directly recovered by exploiting the rank deficiency, along with an additional PDE that constrains the surface normal.

(iii) For colocated lighting, we show that two differential pairs suffice for recovering shape.

(iv) For general directional lighting, we show that three differential pairs suffice for recovering shape, without requiring knowledge of lighting.

(v) When we have additional depth sensor input, our method can be used to obtain depth input with surface normal information, thereby improving accuracy.

Next, one of our exemplary set ups is discussed. The camera and lighting in our setup are fixed, while the object moves. The object BRDF is assumed isotropic and homogeneous (or having slow spatial variation), with an unknown functional form. The distant illumination may be directional or environment. Interreflections and shadows are assumed negligible. Let the focal length of the camera be f. The principal point on the image plane is defined as the origin of the 3D coordinate system, with the camera center at $(0,0,-f)^T$. Denoting $\beta=f^{-1}$, a 3D point $x=(x, y, z)^T$ is imaged at $u=(u, v)^T$, where $$u=x/(1+\beta z), v=y/(1+\beta z). \quad (1)$$

Differential motion is detailed next. Using the projection equations in (1), the motion field is given by $$\begin{bmatrix} \mu_1 \\ \mu_2 \end{bmatrix} = \begin{bmatrix} \dot{u} \\ \dot{v} \end{bmatrix} = \frac{1}{1+\beta z} \begin{bmatrix} \dot{x} - \beta u \dot{z} \\ \dot{y} - \beta v \dot{z} \end{bmatrix}. \quad (2)$$

Consider a small rotation R; $I+[\omega]_x$ and translation $\tau=(\tau_1, \tau_2, \tau_3)^T$, where $[\omega]_x$ is the skew-symmetric matrix of $\omega=(\omega_1, \omega_2, \omega_3)^T$. Then, $\dot{x}=\omega \times x + \tau$ for a point x on the object. In the perspective case, the motion field is $$\mu = \left(\alpha_1 + \frac{\alpha_2 + \omega_2 z}{1+\beta z}, \alpha_3 + \frac{\alpha_4 - \omega_1 z}{1+\beta z}\right)^T, \quad (3)$$

where $\alpha_1=\omega_2\beta u^2-\omega_1\beta uv-\omega_3 v$, $\alpha_2=\tau_1-\beta u\tau_3$, $\alpha_3=-\omega_1\beta v^2+\omega_2\beta uv+\omega_3 u$ and $\alpha_4=\tau_2-\beta v\tau_3$. Under orthography, $\beta \to 0$, thus, the motion field is $$\mu=(\alpha_5+\omega_2 z, \alpha_6-\omega_1 z)^T, \quad (4)$$

where $\alpha_5=\tau_1-\omega_3 v$ and $\alpha_6=\tau_2+\omega_3 u$.

Differential flow relation is now discussed. Assuming isotropic BRDF $\rho$, the image intensity of a 3D point x, imaged at pixel u, is $$I(u,t)=\sigma(x)\rho(n,x), \quad (5)$$

where $\sigma$ is the albedo and n is the surface normal at the point. The cosine fall-off is absorbed within $\rho$. The BRDF $\rho$ is usually written as a function of incident and outgoing directions, but for fixed lighting and view, can be seen as a function of surface position and orientation. This is a reasonable image formation model that subsumes traditional ones like Lambertian and allows general isotropic BRDFs modulated by spatially varying albedo. Note that we do not make any assumptions on the functional form of $\rho$, in fact, our theory will derive invariants that eliminate it.

Considering the total derivative on both sides of (5), using the chain rule, we have $$I_u \dot{u} + I_v \dot{v} + I_t = \sigma \frac{d}{dt}\rho(n, x) + \rho \frac{d\sigma}{dt}. \quad (6)$$

Since $\sigma$ is intrinsically defined on the surface coordinates, its total derivative vanishes (for a rigorous derivation, please refer to Appendix 9). Noting that $\mu=(\dot{u}, \dot{v})^T$ is the motion field, the above can be rewritten as $$(\nabla_u I)^T \mu + I_t = \sigma[(\nabla_n \rho)^T(\omega \times n) + (\nabla_x \rho)^T v], \quad (7)$$

where v is the linear velocity and we use $\dot{n}=\omega \times n$. Since lighting is distant and BRDF homogeneous (or with slow spatial variation), $\nabla_x \rho$ is negligible. Moreover, using standard vector identities, $(\nabla_n \rho)^T(\omega \times n)=(n \times \nabla_n \rho)^T \omega$. Denoting $E=\log I$, we note that the albedo can be easily eliminated by dividing out $I(u,t)$, to yield the differential flow relation:

$$(\nabla_u E)^T \mu + E_t = (n \times \nabla_n \log \rho)^T \omega. \quad (8)$$

The differential flow relation in (7) and (42) is a strict generalization of the brightness constancy relation used by the vast majority of prior works on optical flow. Indeed, with a constant BRDF $\rho=1$, the RHS in (7) or (42) vanishes, which is precisely the brightness constancy assumption. However, note that $\rho=1$ is physically unrealistic—even the most basic Lambertian assumption is $\rho(n)=n^T s$, in which case (42) reduces to a well-known relation:

$$(\nabla_u E)^T \mu + E_t = \frac{(n \times s)^T \omega}{n^T s}. \quad (9)$$

In the following, we explore the extent to which the motion field $\mu$ and object shape may be recovered using (42), under both orthographic and perspective image formation. Precisely, we show that it is possible to eliminate all BRDF and lighting effects in an image sequence, leaving a simple relationship between image derivatives, surface depths and normals.

Orthographic Projection is now discussed. We consider recovery of the shape of an object with unknown BRDF, using a sequence of differential motions. Under orthography, the motion field $\mu$ is given by (47). Denoting $\pi=n \times \nabla_n \log \rho$, one may rewrite (42) as $$pz+q=\omega^T \pi, \quad (10)$$

where, using (47), p and q are known entities given by $$p=\omega_2 E_u - \omega_1 E_v \quad (11)$$

$$q=\alpha_5 E_u + \alpha_6 E_v + E_t. \quad (12)$$

Rank-Deficiency in an Image Sequence is discussed next. For $m \geq 3$, consider a sequence of m+1 images, $E_0, \ldots, E_m$, where $E_i$ is related to $E_0$ by a known differential motion $\{\omega^i, \tau^i\}$. We assume that the object undergoes general motion, that is, the set of vectors $\omega^i$, $i=1, \ldots, m$, span $R^3$. Then, from (10), we have a set of relations $$p^i z + q^i = \pi^T \omega^i, i=1, \ldots, m. \quad (13)$$

Note that $p^i$, $q^i$ and $\omega^i$ are known from the images and calibration, while surface depth z and the entity $\pi$ related to normals and BRDF are unknown. It might appear at a glance that using the above m relations in (13), one may set up a linear system whose each row is given by $[p^i, -\omega_1^i, -\omega_2^i, -\omega_3^i]^T$, to solve for both z and $\pi$ at every pixel. However, note the form of $p^i=E_u\omega_2^i-E_v\omega_1^i$, which means that the first column in the involved m×4 linear system is a linear combination of the other three columns. Thus, the linear system is rank deficient (rank 3 in the general case when the set of vectors $\{\omega^i\}$, $i=1, \ldots, m$, span $R^3$), whereby we have:

BRDF-Invariant Constraints on Surface

While one may not use (10) directly to obtain depth, we may still exploit the rank deficiency to infer information about the surface depth. For an object with unknown BRDF, observed under unknown lighting and orthographic camera, three differential motions suffice to yield a BRDF and lighting invariant relation between image derivatives and surface geometry. We have the parameterized solution $$(z, \pi^T)^T = -B^+ q + k(1, -E_v, E_u, 0)^T, \quad (14)$$

where $B^+$ is the Moore-Penrose pseudoinverse of B and k an arbitrary scalar. Define $\gamma = -B^+ q$ and $\gamma' = (\gamma_2, \gamma_3, \gamma_4)^T$. Then, we have the following two relations $$z = \gamma_1 + k \quad (15)$$

$$\pi = \gamma' + k(-E_v, E_u, 0)^T. \quad (16)$$

From the definition of $\pi$, we have $n^T \pi = 0$. Substituting from the above two relations (with $k = z - \gamma_1$), we get $$(\lambda_1 + \lambda_2 z) n_1 + (\lambda_3 + \lambda_4 z) n_2 - \gamma_4 n_3 = 0, \quad (17)$$

where $\lambda_1 = -(\gamma_2 + \gamma_1 E_v)$, $\lambda_2 = E_v$, $\lambda_3 = -\gamma_3 + \gamma_1 E_u$ and $\lambda_4 = -E_u$. Noting that $n_1/n_3 = -z_x$ and $n_2/n_3 = -z_y$, we may rewrite (17) as $$(\lambda_1 \lambda_2 z) z_x + (\lambda_3 + \lambda_4 z) z_y \gamma_4 = 0, \quad (18)$$

which is independent of BRDF and lighting.

Thus, we may directly relate surface depth and gradient to image intensity, even for unknown BRDF and illumination. This is a fundamental constraint that relates object shape to motion, regardless of choice of reconstruction method.

Surface Depth Estimation is discussed next. We consider the precise extent to which surface depth may be recovered using Proposition 2. We first consider the simpler case of a colocated source and sensor, where an isotropic BRDF is given by $\rho(n^T s)$, for an unknown function $\rho$. For our choice of coordinate system, $s = (0, 0, -1)^T$. Recall that $\pi = n \times \nabla_n \log \rho$. It is easily verified that $\pi_3 = 0$, thus, $\gamma_4 = 0$ using (14). The relation in (18) now becomes $$z_x/z_y = -(\lambda_3 + \lambda_4 z)/(\lambda_1 + \lambda_2 z) \quad (19)$$

where the $\lambda_i$, $i = 1, \ldots, 4$ are defined as before. Now, we are in a position to state the following result:

Two or more differential motions of a surface with unknown BRDF, with a colocated source and sensor, yield level curves of surface depth, corresponding to known depths of some (possibly isolated) points on the surface. Define $a = (\lambda_1 + \lambda_2 z, \lambda_3 + \lambda_4 z)^T$. Then, from (19), $$a^T \nabla z = 0. \quad (20)$$

Since $\nabla z$ is orthogonal to the level curves of z, the tangent space to the level curves of z is defined by a. Consider a rectifiable curve $C(x(s), y(s))$ parameterized by the arc length parameter s. The derivative of z along C is given by $$\frac{dz}{ds} = \frac{\partial z}{\partial x}\frac{dx}{ds} + \frac{\partial z}{\partial y}\frac{dy}{ds}. \quad (21)$$

If C is a level curve of $z(x, y)$, then $dz/ds = 0$ on C. Define $t = (dx/ds, dy/ds)$. Then, we also have $$t^T \nabla z = 0. \quad (22)$$

From (20) and (22), it follows that a and t are parallel. Thus, $t_2/t_1 = a_2/a_1$, whereby we get $$dy/dx = (\lambda_3 + \lambda_4 z)/(\lambda_1 + \lambda_2 z). \quad (23)$$

Along a level curve $z(x, y) = c$, the solution is given by $$z = c, \quad (24)$$
$$\frac{dy}{dx} = \frac{\lambda_3 + \lambda_4 c}{\lambda_1 + \lambda_2 c}.$$

Given the value of z at any point, the ODE (24) determines all other points on the surface with the same value of z.

Thus, (19) allows reconstruction of level curves of the surface, with unknown BRDF, under colocated illumination. Note that (19) is a first-order, homogeneous, quasilinear partial differential equation (PDE). Similarly, we may interpret (18) as a PDE in $z(x, y)$, in particular, it is an inhomogeneous, first-order, quasilinear PDE. This immediately suggests the following surface reconstructibility result in the general case:

Three or more differential motions of a surface with unknown BRDF, under unknown illumination, yield characteristic surface curves $C(x(s), y(s), z(s))$, defined by $$\frac{1}{\lambda_1 + \lambda_2 z}\frac{dx}{ds} = \frac{1}{\lambda_3 + \lambda_4 z}\frac{dy}{ds} = \frac{-1}{\gamma_4}\frac{dz}{ds} \quad (25)$$

corresponding to depths at some (possibly isolated) points.

Surface Reconstruction

Given depth $z_0$ at point $(x_0, y_0)^T$, for a small step size ds, the relations (24) or (25) yield $(dx, dy, dz)^T$, such that $(x_0 + dx, y_0 + dy)^T$ lies on the characteristic curves of (18) through $(x_0, y_0)^T$, with depth $z_0 + dz$. The process is repeated until the entire characteristic curve is estimated.

Note that dz is zero for the colocated case since characteristic curves correspond to level curves of depth, while it is in general non-zero for the non-colocated case. In practice, initial depths $z_0$ may be obtained from feature correspondences, or the occluding contour in the non-colocated case.

Perspective Projection

In this section, we relax the assumption of orthography. Surprisingly, we obtain even stronger results in the perspective case, showing that with four or more differential motions with unknown BRDF, we can directly recover surface depth, as well as a linear constraint on the derivatives of the depth. Strictly speaking, our theory is an approximation in the perspective case, since viewing direction may vary over object dimensions, thus, $\nabla_x \rho$ may be non-zero in (7). However, we illustrate in this section that accounting for finite focal length has benefits, as long as the basic assumption is satisfied that object dimensions are small compared to camera and source distance (which ensures that $\nabla_x \rho$ is negligibly small).

Differential Flow Relation

In the perspective case, one may rewrite (42) as (compare to the linear relation in (10) for the orthographic case), $$p'\left(\frac{z}{1+\beta z}\right) + r'\left(\frac{1}{1+\beta z}\right) + q' = \omega^T \pi, \quad (26)$$

where $p' = E_u \omega_2 - E_v \omega_1$, $q' = \alpha_1 E_u + \alpha_3 E_v + E_t$ and $r' = \alpha_2 E_u + \alpha_4 E_v$ are known entities, using (3).

Now, one may derive a theory similar to the orthographic case by treating $z/(1+\beta z)$, $1/(1+\beta z)$ and $\pi$ as independent variables and using the rank deficiency (note the form of p') arising from a sequence of $m \geq 4$ differential motions. We leave the derivations as an exercise for the reader, but note that most of the observations in the preceding section for the orthographic case hold true in the perspective case too, albeit with the requirement of one additional image.

Instead, in the following, we take a closer look at the perspective equations for differential flow, to show that they yield a more comprehensive solution for surface geometry.

BRDF-Invariant Depth Estimation

We demonstrate that under perspective projection, object motion can completely specify the surface depth, without any initial information:

Four or more differential motions of a surface with unknown BRDF, under unknown illumination, suffice to yield under perspective projection:
  the surface depth
  a linear constraint on the derivatives of surface depth.

For $m \geq 4$, let images $E_1, \ldots, E_m$ be related to $E_0$ by known differential motions $\{\omega^i, \tau^i\}$, where $\omega^i$ span $R^3$. From (26), we have a sequence of differential flow relations $$(p^t + \beta q^t)z - ((1+\beta z)\pi)^T \omega^i + (q^t + r^t) = 0, \qquad (27)$$

for $i=1,\ldots,m$. Let $c^i = [p^{ti} + \beta q^{ti}, -\omega_1^t, -\omega_2^t, -\omega_3^t]^T$ be the rows of the m×4 matrix $C = [c^1, \ldots, c^m]^T$. Let $q' = [q^{t1}, \ldots, q^{tm}]^T$ and $r' = [r^{t1}, \ldots, r^{tm}]^T$. Then, we may rewrite the system (27) as $$C \begin{bmatrix} z \\ (1+\beta z)\pi \end{bmatrix} = -(q' + r') \qquad (28)$$

which yields the solution $$\begin{bmatrix} z \\ (1+\beta z)\pi \end{bmatrix} = -C^+(q' + r') \qquad (29)$$

where $C^+$ is the Moore-Penrose pseudoinverse of C. Define $\epsilon = -C^+(q'+r')$ and $\epsilon' = (\epsilon_2, \epsilon_3, \epsilon_4)^T$. Then, we have $$z = \epsilon_1, (1+\beta z)\pi = \epsilon'. \qquad (30)$$

By definition, $\pi = n \times \nabla_n \log \rho$, thus, $n^T \pi = 0$. We now have two separate relations for depths and normals:

$$z = \epsilon_1 \qquad (31)$$

$$n^T \epsilon' = 0. \qquad (32)$$

Thus, in the perspective case, one may directly use (31) to recover the surface depth. Further, noting that $n_1/n_3 = -z_x$ and $n_2/n_3 = -z_y$, we may rewrite (32) as $$\epsilon_3 z_x + \epsilon_3 z_y - \epsilon_4 = 0, \qquad (33)$$

which is a linear constraint on surface depth derivatives.

Again, in the simpler case of colocated illumination, we observe that $\epsilon_4 = 0$, thus, the minimal imaging requirement is three motions. Further, from (32), the ratio $-\epsilon_2/\epsilon_3$ yields the slope of the gradient, leading to:

Three or more differential motions of a surface with unknown BRDF, under unknown illumination, suffice to yield under perspective projection the surface depth and the slope of the gradient. Even when BRDF and illumination are unknown, one may derive an invariant that relates shape to object motion, through a linear relation and a linear PDE on the surface depth. Again, we note that this is a fundamental constraint, independent of any particular reconstruction approach.

Surface Reconstruction is detailed next. Under perspective projection, one may directly recover the surface depth using (31). An object with unknown BRDF is imaged with perspective projection under unknown illumination after undergoing four arbitrary differential motions. No prior knowledge of the surface is required in the perspective case, even at isolated points. Combining Depth and Normal Information can be done by solving the following linear system that combines the two constraints (31) and (33) on depths and gradients:

$$\min_{z(x,y)} (z - \epsilon_1)^2 + \lambda(\epsilon_2 z_x + \epsilon_3 z_y - \epsilon_4)^2, \qquad (34)$$

where $\lambda$ is a relative weighting term. Standard discretization schemes may be used to represent $z_x$ and $z_y$. Then, the above is a highly sparse linear system in the depths z, which may be solved using a linear least squares solver. Incorporating gradient constraints has the effect of regularizing the depth estimation by introducing neighborhood information, which may be advantageous in noisy scenarios.

Stratification of Shape from Motion is discussed next. For the Lambertian BRDF, under known directional lighting, shape and image derivatives may be related by a quasilinear PDE. They use special considerations of the two-view setup to arrive at the result. In the context of our theory, under a directional light source $s = (s_1, s_2, 1)^T/\sqrt{s_1^2 + s_2^2 + 1}$, we have $\rho(n) = n^T s$. Then, we may rewrite the basic relation in (42) as (9). For the orthographic case, using (11) and (12), we may again rewrite (9) as:

$$pz + q = \frac{\lambda_{1'} z_x + \lambda_{2'} z_y + \lambda_{3'}}{-s_1 z_x - s_2 z_y + 1}, \qquad (35)$$

with known scalars $\lambda_{1'} = \omega_2 - \omega_3 s_2$, $\lambda_{2'} = \omega_1 + \omega_3 s_1$ and $\lambda_{3'} = -\omega_1 s_2 + \omega_2 s_1$. Note that (35) is a quasilinear PDE. It may be verified that the perspective case can also be written as a quasilinear PDE:

$$\frac{(p' + \beta q')z + (q' + r')}{1 + \beta z} = \frac{\lambda_{1'} z_x + \lambda_{2'} z_y + \lambda_{3'}}{-s_1 z_x - s_2 z_y + 1}. \qquad (36)$$

In particular, the framework of this paper can also handle general BRDFs, unknown directional or area lighting and various camera projections.

The system analyzes motion which reveals the shape, with unknown isotropic BRDF and arbitrary, unknown distant illumination, for orthographic and perspective projections. We derive differential flow invariants that relate image derivatives to shape and exactly characterize the object geometry that can be recovered. This work generalizes traditional notions of brightness constancy or Lambertian BRDFs in the optical flow and multiview stereo literatures. Our results are not just valid for a particular approach to reconstruction, rather they impose fundamental limits on the hardness of surface reconstruction. In the process, we also present a stratification of shape from motion that relates hardness of reconstruction to scene complexity—qualitatively in terms of the nature of the involved PDE and quantitatively in terms of the minimum number of required motions.

Many of the relations, such as (19), (35) and (36) may be expressed in the form f(z)=g(n). With the availability of depth sensors, it becomes possible to measure f(z), making the optimization problem to solve for only n easier. The accuracy and convergence of alternating minimization approaches can be used to simultaneously estimate depth and normals.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for determining three dimensional (3D) shape, comprising:
    capturing with a camera a plurality of images of an object in motion;
    deriving a general relation that relates spatial and temporal image derivatives to bidirectional reflectance distribution function (BRDF) derivatives;
    with isotropic BRDF $\rho$, determining image intensity I of a 3D point x, imaged at pixel u, as $$I(u,t)=\sigma(x)\rho(n,x),$$

where $\sigma$ is the albedo and n is the surface normal at the point and cosine fall-off is absorbed within $\rho$ and relating I to depth and gradient;
    exploiting rank deficiency to eliminate BRDF terms and recover depth or normal for directional lighting; and
    using depth-normal-BRDF relation to recover depth or normal for unknown arbitrary lightings; and
    determining the 3D shape from the motion.

2. The method of claim 1, comprising applying rank deficiency to estimate depth for lighting colocated with the camera.

3. The method of claim 2, comprising:
    using two or more differential pairs of images to eliminate BRDF terms and derive a homogeneous quasilinear PDE in surface depth;
    solving the PDE recover level curves of a surface; and
    interpolating the level curves to recover dense depth.

4. The method of claim 2, comprising:
    using three or more differential pairs of images to eliminate BRDF terms to extract a first equation that directly yields the surface depth and a second equation that represents a homogeneous quasilinear PDE in surface depth.

5. The method of claim 1, comprising applying rank deficiency in to estimate depth for an unknown directional point light source.

6. The method of claim 5, comprising
    using three or more differential pairs of images to eliminate BRDF terms and derive a homogeneous quasilinear PDE in surface depth;
    solving the PDE recover level curves of a surface; and
    interpolating the level curves to recover dense depth.

7. The method of claim 5, comprising using 4 or more differential pairs of images, we may eliminate BRDF terms to extract two equations. The first directly yields the surface depth, while the second is an inhomogeneous quasilinear PDE in surface depth.

8. The method of claim 1, comprising detecting an area light source with a diffuse BRDF as a quadratic function of the surface normal, wherein a differential stereo relation is a nonlinear PDE in surface depth to be solved using a nonlinear optimization method.

9. The method of claim 1, comprising receiving additional depth data with surface normal information from a depth sensor to enhance accuracy.

10. The method of claim 1, comprising applying rank deficiency in to estimate depth for an unknown arbitrary point light source.

11. The method of claim 10, comprising
    using three or more differential pairs of images to eliminate BRDF terms to derive an inhomogeneous quasilinear PDE in surface depth;
    solving the PDE to recover level curves of the surface using a method of characteristics; and
    interpolating the level curves to recover dense depth.

12. The method of claim 10, comprising using four or more differential pairs of images to eliminate BRDF terms to determine a surface depth constraint and a linear constraint on the surface gradient, and combining the constraints to yield a sparse linear system to recover a surface depth.

13. The method of claim 1, comprising modeling a dependence of surface reflectance on surface normal, lighting and viewing directions.

14. The method of claim 1, comprising detecting a rank deficiency in differential stereo relations and applying the rank deficiency to eliminate BRDF and lighting dependence.

15. The method of claim 1, comprising determining a relationship in a depth-normal-BRDF relationship to eliminate BRDF and dependence on arbitrary unknown lighting.

16. The method of claim 1, comprising eliminating BRDF and a lighting to handle objects that reflects without calibrating the lighting.

17. The method of claim 1, comprising deriving a BRDF-invariant expressions as quasilinear PDEs, and solving the PDEs.

18. The method of claim 1, comprising deriving linear constraints on depth and gradient and solving the linear constraints as a sparse linear system to yield surface depth with unknown BRDF and arbitrary unknown illumination.

19. The method of claim 1, for depth from collocated lighting with an orthographic camera, comprising
    recovering level curves; and
    interpreting the level curves to recover dense depth.

20. The method of claim 1, for depth from collocated lighting with an orthographic camera, comprising:
    discretizing a quasilinear PDE; and
    determining depth as a non-linear optimization problem.

\* \* \* \* \*